July 22, 1952 K. KEHLER 2,604,296
RING VALVE FOR COMPRESSORS
Filed July 2, 1948 2 SHEETS—SHEET 1
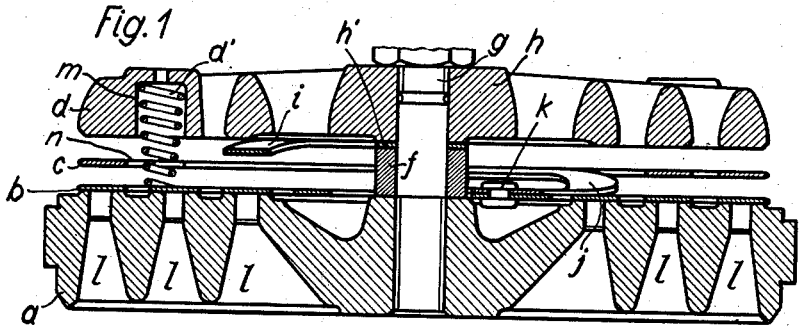
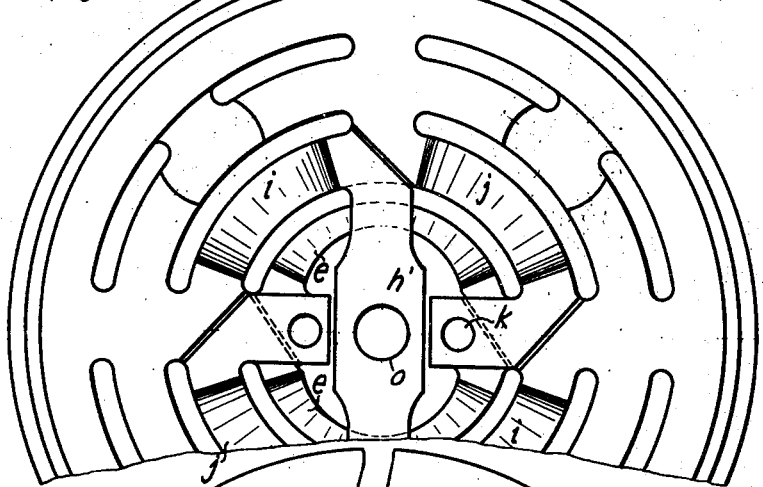
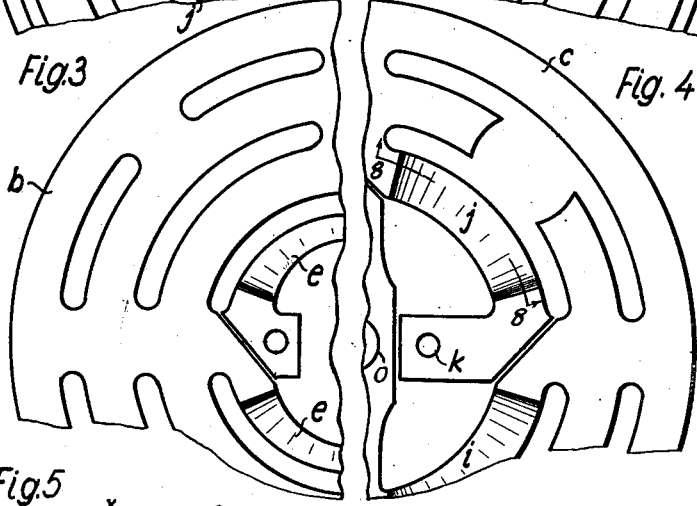
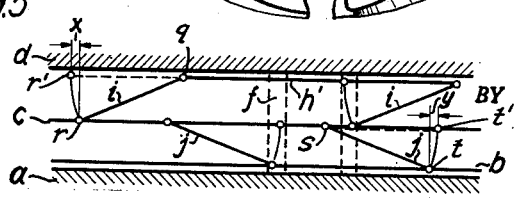
INVENTOR:
KARL KEHLER
BY
ATTORNEY July 22, 1952 K. KEHLER 2,604,296
RING VALVE FOR COMPRESSORS
Filed July 2, 1948 2 SHEETS—SHEET 2
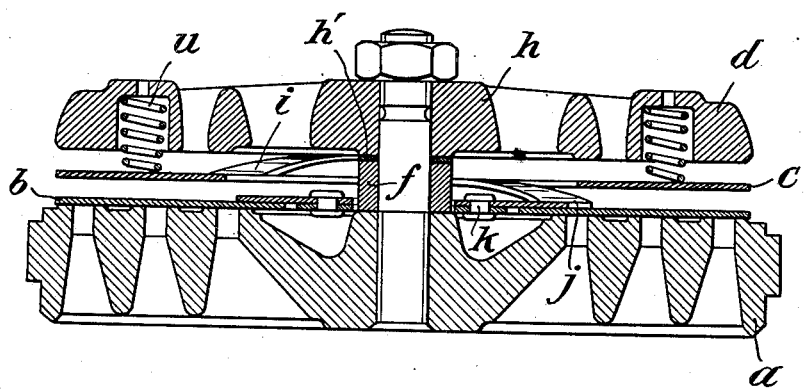
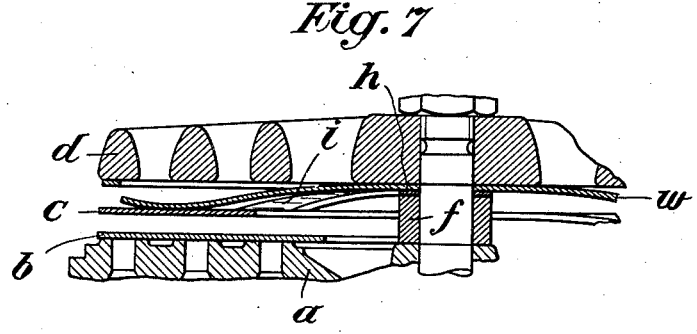
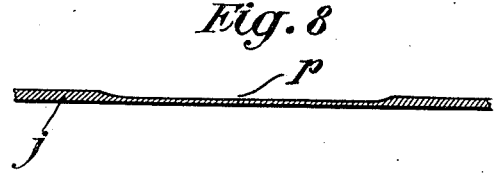
INVENTOR.
KARL KEHLER.
BY K. H. Mayr
ATTORNEY.

Patented July 22, 1952

2,604,296

UNITED STATES PATENT OFFICE 2,604,296

RING VALVE FOR COMPRESSORS

Karl Kehler, Vienna, Austria, assignor to Hoerbiger & Co., Vienna, Austria, a firm Application July 2, 1948, Serial No. 36,696
In Austria July 7, 1947

7 Claims. (Cl. 251—119)

My invention relates to ring valves for compressors.

Ring valves are known in which the valve plate is guided without friction by means of a guide plate. That type of valve construction has the disadvantage that the valve plate, during its lifting and seating motions, simultaneously performs a rotary motion in the plane of the plate, due to the fact that the guide arms connected with the valve plate all extend in the same circumferential direction and are bent outward on one side. The rotation of the valve plate about its central axis during every lifting and seating motion has the effect that in the closing operation the valve plate approaches the valve seat with a helical motion so that a rapid movement of the valve plate directly perpendicular to the valve seat, essential for a tight seating of the valve, is not achieved. The rotary motion of the valve plate has the further disadvantage that the guide arms of the guide plate, especially in high-speed engines and when the lift of the plate is relatively high, are subject to heavy additional wear, frequently resulting in breakage of the guides.

The object of my invention is to provide an improved ring valve in which the valve plate does not perform any rotary motion in the plane of the plate during the lifting and seating operations. According to the invention this is achieved by providing the guide plate with an even number of guide arms cut out of the plate and divided into two groups. The guide arms of one group are bent towards the stop plate and have their free ends joined together at the center, while the guide arms of the other group, positioned between and alternating with those of the first group, are bent towards the valve plate and have their free ends fastened to the valve plate, those parts of the guide arms which are inclined with respect to the plane of the plate occupying sectors of equal size. This and other objects of my invention will become apparent from the following description and the appended drawings wherein like reference characters are used to designate like parts throughout the several views, and in which:

Fig. 1 is an elevational view, partly in section, through a valve according to this invention;

Fig. 2 is a plan view of the valve of Fig. 1 with the stop plate removed;

Fig. 3 is a plan view of the left half of the valve plate of Fig. 1;

Fig. 4 is a plan view of the right half of the guide plate of Fig. 1;

Fig. 5 is a diagrammatic development of a section through a valve according to this invention, taken along the guide arms;

Fig. 6 is a view, similar to Fig. 1, showing a modified valve according to this invention;

Fig. 7 is a fragmentary view, similar to Fig. 1 showing another modified valve according to this invention; and Fig. 8 is a section, on an enlarged scale, through a guide arm, taken along line 8—8 of Fig. 4.

Referring now to Figs. 1 to 4 and 8, a ring valve in accordance with this invention comprises a valve seat $a$ provided with valve ports $i$ which are closed by a valve plate $b$, with which is associated a guide plate $c$ positioned halfway between the valve plate $b$ and and a stop plate $d$. In recesses $m$ in the stop plate $d$ are provided helical springs $d'$, which extend through apertures $n$ in the guide plate $c$ and press the valve plate $b$ against the valve seat $a$. The guide plate $c$ has two guide arms $i$, in diametrically opposite positions, bent up towards the stop plate $d$ and are joined to each other at their ends by a web $h'$ which is clamped between the hub $h$ of the stop plate $d$ and a spacer $f$ supported by the valve seat $a$. A centering bolt $g$ for the valve passes from the valve seat $a$ through the spacer $f$ and an opening $o$ in the web $h'$ to the stop plate $d$.

The guide plate $c$ is provided with two other guide arms $j$, positioned between the guide arms $i$ and bent towards the valve plate $b$. The guide arms $j$ extend in the same circumferential direction as the guide arms $i$. The ends of the guide arms $j$ are fastened by means of rivets $k$ to two arms $e$ of the valve plate $b$ said arms $e$ extending through cut-out portions in the guide plate $c$. The guide arms $i$ and $j$ as well as the arms $e$ are concave at $p$, Fig. 8, in their central, hatched, portions which are resilient because of their reduced thickness. In operation of the valve shown in Figs. 1 to 4 and 8, the guide arms $i$ and $j$ are bent out of the plane of the guide plate $c$ when the valve is closed, i. e. when the valve plate $b$ rests on the valve seat $a$, the position shown in Fig. 1. When the valve plate $b$ lifts to open the valve, the guide arms $i$ and $j$ bend back into the plane of guide plate $c$. In the fully open position, the guide plate $c$ rests against the stop plate $d$, and the valve plate $b$ rests against the guide plate $c$, having reached such position by a straight lifting motion without any rotation whatsoever, as will be clearly understood from the diagrammatic showing of Fig. 5.

As shown in Fig. 5, each guide arm $i$ has one end $g$ connected with the web $h'$ which is clamped against the stop plate $d$ and, therefore, fixed to the body of the ring valve. The other end of the guide arm $i$, connected with the guide plate $c$, occupies the position $r$ when the valve is closed. When the valve opens, the guide plate $c$ is lifted, and the guide arm $i$ moves from the position shown in a solid line to that shown in a broken line, the point $r$ moving to $r'$. Consequently, during the lifting, the guide plate $c$ rotates to the left to an extent designated $x$.

Each guide arm $j$, on the other hand, has one end fixed to the guide plate $c$ at $s$ and the other end to the valve plate $b$, the position being at $t$ when the valve is closed and at $t'$ when the valve is open. Thus, during lifting, the valve plate $b$, relative to the guide plate $c$, rotates to the right to an extent designated $y$.

The guide arms $i$ and $j$ occupy equal sectors, and more specifically are of equal length and positioned on the same circle, as shown. Moreover, the two groups of guide arms, $i$ and $j$, protrude from the plane of the guide plate $c$ along screw threads of opposite name, one being left-handed and the other right-handed, as clearly shown in Figs. 1 and 5. Due to these facts, the left hand rotational motion $x$ of the guide plate $c$ relative to the stop plate $d$ (fixed to the valve body) and the right hand rotational motion of the valve plate $b$ relative to the guide plate $c$ are of equal size and opposite directions so that they compensate each other with the result that the valve plate $b$ moves straight up without any rotation. The guide arms $i$ and $j$ must bend during the valve opening and closing operations, and such bending is made possible by the provisions of the cavities $p$ which make the guide arms $i$ and $j$, as well as the arms $e$, thin enough to become resilient. This arrangement permits making the guide plate $c$ of relatively thick material resulting in good damping qualities.

The guide plate $c$ can be spring loaded like the valve plate $b$ in Fig. 1 by providing helical springs $u$ (Fig. 6) or plate springs $w$ (Fig. 7) which like the springs $d'$ may be supported by the stop plate $d$.

The straight lifting and return motion of the valve plate guided by my novel arrangement provides a more tightly seating valve and greatly reduces the danger of damage to the component parts of the guide means. While I have shown and described what I consider the preferred embodiments of my invention, I recognize that various modifications may occur to persons skilled in the art without departing from the spirit of my invention, and reference is, therefore, made to the appended claims for a definition of the scope of my invention.

I claim:

1. A plate valve comprising a valve seat, a valve plate adapted to seat on said valve seat, a stop plate for limiting the opening of the valve plate, a centering bolt connected to said valve seat and said stop plate for aligning same, a guide plate interposed between said valve plate and said stop plate, said guide plate comprising a group of resilient portions extending out of the plane of the guide plate toward said valve plate and having end portions rigidly connected with the valve plate, said guide plate comprising another group of resilient portions extending out of the plane of the guide plate toward said stop plate and being connected with said centering bolt for maintaining alignment of said guide plate and the valve plate connected therewith, with said valve seat and said stop plate, the resilient portions of one of said groups protruding along a right hand screw thread and the resilient portions of the other of said groups protruding along a left hand screw thread.

2. A plate valve as defined in claim 1, said resilient portions having central portions of concave configuration with respect to the plane of the guide plate.

3. A plate valve as defined in claim 1, in which the number of said resilient portions is even, one half of the number of the resilient portions extending substantially circularly and protruding toward the valve plate, the other half also extending substantially circularly in the same direction as the first half and protruding toward the stop plate and alternating with the first resilient portions and being connected in pairs with said centering means.

4. A plate valve as defined in claim 1, said resilient portions being of the same size and configuration.

5. A plate valve as defined in claim 1, comprising resilient means interposed between said stop plate and said guide plate for urging the latter toward said valve plate.

6. A plate valve as set forth in claim 5, in which said resilient means are in the form of coil springs.

7. A plate valve as set forth in claim 5, in which said resilient means is in the form of a plate spring centered on said centering bolt and slidingly abutting said valve plate.

KARL KEHLER.

REFERENCES CITED

The following references are of record in the file of this patent:

UNITED STATES PATENTS

| Number | Name | Date |
|---|---|---|
| 810,216 | Neeland | Jan. 16, 1906 |
| 1,416,637 | Hart | May 16, 1922 |
| 1,695,069 | Tuttle | Dec. 11, 1928 |
| 1,833,841 | Leinert | Nov. 24, 1931 |

FOREIGN PATENTS

| Number | Country | Date |
|---|---|---|
| 149,264 | Austria | Apr. 10, 1937 |
| 151,862 | Austria | Dec. 10, 1937 |
| 543,006 | Great Britain | of 1942 |
| 664,890 | Germany | of 1938 |